US006261638B1

(12) United States Patent
van Ooij et al.

(10) Patent No.: US 6,261,638 B1
(45) Date of Patent: *Jul. 17, 2001

(54) METHOD OF PREVENTING CORROSION OF METALS USING SILANES

(75) Inventors: Wim J. van Ooij, Fairfield, OH (US); Vijay Subramanian, Ann Arbor; Chunbin Zhang, Troy, both of MI (US)

(73) Assignee: University of Cincinnati, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/341,422

(22) PCT Filed: Jan. 8, 1998

(86) PCT No.: PCT/EP98/00084

§ 371 Date: Nov. 1, 1999

§ 102(e) Date: Nov. 1, 1999

(87) PCT Pub. No.: WO98/30735

PCT Pub. Date: Jul. 16, 1998

Related U.S. Application Data

(63) Continuation of application No. 08/781,126, filed on Jan. 9, 1997, now Pat. No. 5,750,197.

(51) Int. Cl.[7] ........................................................ B05D 7/14

(52) U.S. Cl. .......................... 427/379; 427/409; 427/387; 427/388.1; 427/388.4

(58) Field of Search .................................. 427/387, 409, 427/379, 388.1, 388.4

(56) References Cited

U.S. PATENT DOCUMENTS

| | | |
|---|---|---|
| Re. 34,675 | 7/1994 | Plueddemann . |
| 2,751,314 | 6/1956 | Keil . |
| 3,022,196 | 2/1962 | Jenkins et al. . |
| 3,246,671 | 4/1966 | Stein et al. . |
| 3,476,826 | 11/1969 | Millen . |
| 3,816,152 | 6/1974 | Yates . |
| 3,873,334 | 3/1975 | Lee et al. . |
| 3,879,206 | 4/1975 | Nestler et al. . |
| 3,960,800 | 6/1976 | Kohl, Jr. . |
| 4,000,347 | 12/1976 | Ranney et al. . |
| 4,015,044 | 3/1977 | Ranney et al. . |
| 4,059,473 | 11/1977 | Okami . |
| 4,064,313 | 12/1977 | Takiguchi et al. . |
| 4,151,157 | 4/1979 | Williams et al. ............... 106/193 R |
| 4,152,347 | 5/1979 | Pletka et al. . |
| 4,179,537 | 12/1979 | Rykowski . |

(List continued on next page.)

FOREIGN PATENT DOCUMENTS

| | | |
|---|---|---|
| 2110461 | 7/1994 | (CA) . |
| 3443926A1 | 6/1986 | (DE) . |
| 0435781A2 | 7/1991 | (EP) . |
| 0533606A1 | 3/1993 | (EP) . |
| 0579253B1 | 1/1994 | (EP) . |
| 53-3076 | 2/1978 | (JP) . |
| 5852036 | 11/1981 | (JP) . |
| 56-161475 | 12/1981 | (JP) . |
| 60-81256 | 5/1985 | (JP) . |
| 60-208480 | 10/1985 | (JP) . |
| 60-213902 | 10/1985 | (JP) . |
| 62-7538 | 1/1987 | (JP) . |
| 62-57470 | 3/1987 | (JP) . |
| 63-97266 | 4/1988 | (JP) . |
| 63-97267 | 4/1988 | (JP) . |
| 63-34793 | 7/1988 | (JP) . |
| 533275 | 5/1993 | (JP) . |
| 6184792 | 7/1994 | (JP) . |
| WO9830735 | 7/1998 | (WO) . |
| WO9920682 | 4/1999 | (WO) . |
| WO9920705 | 4/1999 | (WO) . |

OTHER PUBLICATIONS

Buchwalter, L.P., et al., Adhesion of polyimides to ceramics: Effects of aminopropyltriethoxysilane and temperature and humidity exposure on adhesion, *J. Adhesions Sci. Technol.*, vol. 5, No. 4, pp. 333–343 (1991).

Cruse, R. W., et al., Effect of Polysulfidic Silane Sulfur on Rolling Resistance, *Rubber & Plastic News*, pp. 14–17 (Apr. 21, 1997).

Henriksen, P.N., et al., Inelastic electron tunneling spectroscopic studies of alkoxysilanes adsorbed on alumina, *J. Adhesion Sci. Technol.*, vol. 5, No. 4, pp. 321–331 (1991).

Hornstrom, S.E., et al., Paint Adhesion and Corrosion of Performance of Chromium–Free Pretreatment of 55% Al–Zn–coated Steel, *J. Adhesion Sci. Technol.* vol. 10, No. 9, pp. 987–990 (1997).

Hornstrom, S.E., et al., Characterization of Thin Films of Organofunctional and Non–Functional Silanes on 55A1–43, 4Zn–1.6Si Alloy Coated Steel, *ECASIA* 97, pp. 987–990 (1997).

Luginsland, H. D., Reactivity of the Sulfur Functions of the Disulfane Silane TESPD and the Tetrasulfane Silane TESPT, presented at a meeting of the Rubber Division, American Chemical Society, Chicago, Illinois (Apr. 13–16, 1999).

Plueddemann, Edwin P., Silane primers for epoxy adhesives, *J. Adhesion Sci. Technol.*, vol. 2, No. 3, pp. 179–188 (1988).

Plueddemann, Edwin P., Reminiscing on Silane Coupling Agents, *J. Adhesion Sci. Technol.*, vol. 5, No. 4, pp. 261–277 (1991).

Plueddemann, Edwin P., et al., Adhesion Enhancing Additives for Silane Coupling Agents, 42nd Annual Conference, Composites Institute, The Society of the Plastics Industry, Inc., (Feb. 2–6, 1987).

(List continued on next page.)

*Primary Examiner*—Erma Cameron
(74) *Attorney, Agent, or Firm*—Dinsmore & Shohl LLP

(57) ABSTRACT

A method of treating a metal substrate by applying a first coating treatment solution of 0.1% by volume of at least one silane, wherein the silane consists only of a multi-functional silane having at least two trisubstituted silyl groups, wherein the substituents are individually chosen from the group consisting of alkoxy and acetoxy, and wherein the multi-functional silane has been at least partially hydrolyzed and wherein the first coating treatment solution has a pH of less than about 7.

42 Claims, No Drawings

U.S. PATENT DOCUMENTS

| | | |
|---|---|---|
| 4,210,459 | 7/1980 | Williams et al. ............... 106/308 N |
| 4,231,910 | 11/1980 | Plueddemann . |
| 4,243,718 | 1/1981 | Murai et al. . |
| 4,315,970 | 2/1982 | McGee . |
| 4,401,500 | 8/1983 | Hamada et al. . |
| 4,409,266 | 10/1983 | Wieczorrek et al. . |
| 4,441,946 | 4/1984 | Sharma . |
| 4,457,970 | 7/1984 | Das et al. . |
| 4,461,867 | 7/1984 | Surprenant . |
| 4,489,191 | 12/1984 | Chung . |
| 4,534,815 | 8/1985 | Hamada et al. . |
| 4,618,389 | 10/1986 | Agodoa . |
| 4,681,636 | 7/1987 | Saito et al. . |
| 4,719,262 | 1/1988 | Plueddemann . |
| 4,863,794 | 9/1989 | Fujii et al. . |
| 5,051,129 | 9/1991 | Cuthbert et al. . |
| 5,073,195 | 12/1991 | Cuthbert et al. . |
| 5,073,456 | 12/1991 | Pallacino . |
| 5,108,793 | 4/1992 | van Ooij et al. . |
| 5,217,751 | 6/1993 | King et al. . |
| 5,221,371 | 6/1993 | Miller . |
| 5,292,549 | 3/1994 | van Ooij et al. . |
| 5,322,713 | 6/1994 | van Ooij et al. . |
| 5,326,594 | 7/1994 | Sabata et al. . |
| 5,363,994 | 11/1994 | Angeline . |
| 5,389,405 | 2/1995 | Purnell et al. . |
| 5,393,353 | 2/1995 | Bishop . |
| 5,405,985 | 4/1995 | Parker et al. . |
| 5,412,011 | 5/1995 | Morris et al. . |
| 5,433,976 | 7/1995 | van Ooij et al. . |
| 5,455,080 | 10/1995 | van Ooij et al. . |
| 5,466,848 | 11/1995 | Childress . |
| 5,468,893 | 11/1995 | Parker et al. . |
| 5,520,768 | 5/1996 | Crook et al. . |
| 5,603,818 | 2/1997 | Brent et al. . |
| 5,622,782 | 4/1997 | Poutase, III et al. ............... 428/344 |
| 5,633,038 | 5/1997 | Ruschau . |
| 5,639,555 | 6/1997 | Bishop . |
| 5,660,884 | 8/1997 | Crook et al. . |
| 5,700,523 | 12/1997 | Petrole et al. . |
| 5,750,197 | 5/1998 | van Ooij et al. . |
| 5,759,629 | 6/1998 | van Ooij et al. . |
| 5,789,080 | 8/1998 | Grimberg et al. . |
| 5,907,015 | 5/1999 | Sexsmith . |

OTHER PUBLICATIONS

Pu, Z., et al., Hydrolysis Kinetics and Stability of Bis (Triethoxysilyl) Ethane in Water–Ethanol Solution by FTIR Spectroscopy, *Journal of Adhesion Science and Technology* (1996).

Sabata, A., et al., Trend toward a better understanding of the interface in painted metals, *Trends in Corrosion Research*, 1, pp. 181–193 (1993).

Sabata, A., et al., The interphase in painted metals pretreated by functional silanes, *J. Adhesion Sci. Technol.*, vol. 7, No. 11, pp. 1153–1170 (1993).

Sabata, A. Et al., TOFSIMS Studies of Cleaning Procedures and Silane Surface Treatments of Steels, *Journal of Testing and Evaluation*, JTRVA, vol. 23, No. 2, pp. 119–125 (Mar. 1995).

van Ooij, W. J., et al., Characterization of Films of Organofunctional Silanes by ToF–SIMS, *Surface and Interface Analysis*, vol. 20, pp. 475–484 (1993).

van Ooij, W. J., et al., Modifications of the Interface Between Paints and Stainless Steels by Means of an Interphase Crosslinked Organofunctional, Materials Research Society Symposium Proceedings, vol. 304, pp. 155–160, (1993).

van Ooij, W. J., et al., Novel Silane–Based Pretreatments of Metals to Replace Chromate and Phosphate Treatment, *2nd Annual Advanced Techniques for Replacing Chromium: An Information Exchange*, prepared by David S. Viszlay, Concurrent Technologies Corp. NDCEE, Seven Springs Mountain Resort, Champion, PA (Nov. 7–8, 1995), pp. 287–310.

van Ooij, W. J., et al., On the Use, Characterization and Performance of Silane Coupling Agents Between Coatings and Metallic or Ceramic Substrates, *American Institute of Physics*, pp. 305–321 (1996).

van Ooij, W. J., et al., Silane–Based Pretreatments of A1 and its Alloys as Chromate Alternatives, Aluminium Surface Science Technology, "Elzenweld" Antwerp–Belgium, (May 12–15, 1997).

van Ooij, W. J. et al., Silane Coupling Agent Treatments of Metals for Corrosion Protection, Presented at the Fourth International Forum and business Development Conference on Surface Modification, Couplants and Adhesion Promoters, Adhesion Coupling Agent Technology 97, Boston, MA (Sep. 22–24, 1997).

van Ooij, W. J., et al., Pretreatment of Metals for Painting by Organofunctional Silanes, Extended Abstract Paper Presented at 1997 International Symposium on Advances in Corrosion Protection by Organic Coatings, Noda, Japan (Oct. 29–31, 1997).

van Ooij, W. J., et al., Rubber to Metal Bonding, Presented at the International Conference on Rubbers, Calcutta, India (Dec. 12–14, 1997).

Walker, P., Organosilanes as adhesion promoters, *J. Adhesion Sci. Technol.* vol. 5, No. 4, pp. 279–305 (1991).

Wu, G. L. Et al. Alcoholysis of Chlorosilanes and the Synthesis of Silance Coupling Agents, Inst. Chem., Adad. Sin., Peking, People Rep. China, Hua Hsueh Hsueh Pao (1980) (Abstract Only).

Yuan, W., et al., Characterization of Organofunctional Silane Films on Zinc Substrates, Submitted to *Journal of Colloid and Interface Science*, (Aug. 30, 1996).

Zhang, B. C., et al., Characterization of Silane Films Deposited on Iron Surfaces, Submitted to Langmuir, First Revision, (May 3, 1996).

Abstract of Japanese patent No. 62–79732 (Oct. 4, 1994).

Abstract of Japanese patent No. 41–6174 (Apr. 8, 1992).

Abstract of Japanese patent No. 62–216727 (Sep. 24, 1987).

Abstract of Japanese patent No. 40–46932 (Feb. 17, 1992).

Comyn, J., et al., An Examination of the interaction of silanes containing carbon–carbon double bonds with aluminum oxide by inelastic electron tunneling spectroscopy, *Int. J. Adhesion* (1990), 10(1), 13–18 (abstract only).

Kurth, D.G., et al., Monomolecular layers and thin films of silane coupling agents by vapor–phase adsorption on oxidized aluminum, *J. Phys. Chem* (1992), 96(16), 6707–12 (abstract only).

van Ooij, W. J., Silane–based Metal Pretreatments to Replace Phosphates and Chromates; copy of overhead slides presented at the 3rd Annual Advanced Techniques for Replacing Chromium: An Information Exchange and Technology Demonstration, Nov. 4–6, 1996.

Abstract of Japanese patent No. 59–185779 (Oct. 22, 1984).

Abstract of Japanese patent No. 07–329104 (Dec. 19, 1995).

Abstract of Japanese patent No. 62–83034 (Apr. 16, 1987).

2nd Annual Advanced Techniques for Replacing Chromium: An Information Exchange, 11/1995, van Ooij, pp. 287–310, Nov. 1995.*

* cited by examiner

METHOD OF PREVENTING CORROSION OF METALS USING SILANES

This application is a continuation of U.S. Pat. No. 5,750,197, filed Jan. 9, 1997 patent Ser. No. 08/781,126.

BACKGROUND OF THE INVENTION

1. Field of the Invention

The present invention relates to a method of preventing corrosion of metal. More particularly, the method comprises applying a solution containing one or more multi-functional silanes to a metal substrate. If the metal is to be painted, this treatment may be followed by applying a solution of an organofunctional silane. The method is particularly useful for the treatment of cold-rolled steel, aluminum and aluminum alloys.

2. Description of Related Art

Most metals are susceptible to corrosion, in particular atmospheric corrosion. Such corrosion will significantly affect the quality of such metals, as well as that of the products produced therefrom. Although this corrosion may sometimes be removed from the metal, such steps are costly and may further diminish the utility of the final product. In addition, when polymer coatings such as paints, adhesives, or rubbers are applied to the metal, corrosion of the base metal material may cause a loss of adhesion between the polymer coating and the base metal. A loss of adhesion between the polymer coating and the base metal can likewise lead to corrosion of the metal. Aluminum alloys are particularly susceptible to corrosion as the alloying elements used to improve the metals mechanical properties (e.g., copper, magnesium and zinc) will decrease corrosion resistance.

Prior art techniques for improving corrosion resistance of metal, particularly metal sheet, include passivating the surface by means of a heavy chromate treatment. Such treatment methods are undesirable, however, because the chromium is highly toxic, carcinogenic and environmentally undesirable. It is also known to employ a phosphate conversion coating in conjunction with a chromate rinse in order to improve paint adherence and provide corrosion protection. It is believed that the chromate rinse covers the pores in the phosphate coating, thereby improving the corrosion resistance and adhesion performance. Once again, however, it is highly desirable to eliminate the use of chromate altogether. Unfortunately, the phosphate conversion coating is generally not effective without the chromate rinse.

Recently various techniques for eliminating the use of chromate have been proposed. These include the steps of providing an aqueous alkaline solution comprising an inorganic silicate and a metal salt in an amount to coat a steel sheet, followed by treating the silicate coating with an organofunctional silane (U.S. Pat. No. 5,108,793). U.S. Pat. No. 5,292,549 teaches the rinsing of metal sheet with an aqueous solution containing low concentrations of an organofunctional silane and a crosslinking agent, such as bistrimethoxy silylethane in order to provide temporary corrosion protection. The crosslinking agent cross links the organofunctional silane to form a denser siloxane film. In one embodiment an organofunctional silane solution is used to treat a metal surface followed by application of a second treatment solution 3 containing a crosslinking agent. One significant drawback to the methods of this patent is that the organofunctional silane will not bond well to the metal surface, and thus the coating may be easily rinsed off.

U.S. Pat. No. 5,393,353 describes a method for preparing a chromium-free black zinc-nickel alloy surface containing at least about 8% nickel in the alloy. The method comprising contacting said surfaces with an aqueous acid solution of an inorganic acid, preferably a phosphorus acid, the solution optionally additionally containing at least one silane, such as bistrimethoxysilylethane.

U.S. Pat. No. 4,689,085 describes coupling agent and primer compositions comprising a conventional silane coupling agent and a disilyl cross linker compound in the same composition solution.

U.S. Pat. No. 5,433,976 teaches the rinsing of a metal sheet with an alkaline solution containing a dissolved silicate or aluminate, an organofunctional silane and a cross-linking agent in order to form an insoluble composite layer containing siloxane.

The water solubility of some silanes may be limited creating solubility problems in the aqueous solution. Additionally, some metal substrates are particularly prone to corrosion upon contact with water, thus, an aqueous solution may be undesirable in some circumstances.

Various other techniques for preventing the corrosion of metal sheets have also been proposed. Many of these proposed techniques, however are ineffective, or require time-consuming, energy-inefficient, multi-step processes. Thus, there is a need for a simple, low-cost technique for preventing corrosion of metals, particularly metal sheet and cast aluminium or aluminium alloys, including those instances wherein a polymer coating such as paint is to be applied to the metal.

SUMMARY OF THE INVENTION

It is an object of the present invention to provide an improved method of preventing corrosion of metals.

It is another object of the present invention to provide a method of preventing corrosion of metals, wherein the treatment compositions employed need not be removed prior to painting or coating with another polymer such as adhesives or rubber coatings.

The foregoing objects can be accomplished, in accordance with one aspect of the present invention, by providing a method of pretreating a metal substrate to improve corrosion resistance, comprising the steps of:

(a) providing a metal substrate; and (b) applying a first treatment solution directly onto the surface of the metal, the first treatment solution containing at least one multi-functional silane having at least two trisubstituted silyl groups wherein the substituents are individually chosen from the group consisting of alkoxy and acetoxy, wherein the multi-functional silane has been at least partially hydrolyzed.

The first treatment solution preferably has a pH of less than about 7 to ensure proper hydrolysis. One significant advantage of the present invention is that the first treatment solution may be applied directly onto the surface of the metal without an underlying layer of a silicate, aluminate or other coating as required by many of the prior art treatment methods.

More than one multi-functional silane may be employed, and each may comprise:

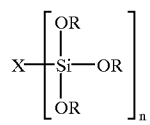

wherein X is either a bond, an aliphatic or aromatic group, each R is an alkyl or acetyl group, and n is 2 or 3. Preferably each R is individually chosen from the group consisting of: ethyl, methyl, propyl, iso-propyl, butyl, iso-butyl, sec-butyl, ter-butyl and acetyl. X may be chosen from the group consisting of: $C_1$–$C_6$ alkyl, $C_1$–$C_6$ alkenyl, $C_1$–$C_6$ alkyl substituted with at least one amino group, $C_1$–$C_6$ alkenyl substituted with at least one amino group, benzyl, and benzyl substituted with $C_1$–$C_6$ alkyl. The preferred multi-functional silane is 1,2-bis-(triethoxysilyl)ethane (BTSE).

The multi-functional silane coating is also preferably cured at a temperature of between about 60° C. and about 250° C. for between about one minute and about 2 hours. After curing, the first treatment solution may be reapplied, and cured if desired.

If the metal substrate is to be painted or coated with another polymer such as an adhesive or rubber, a second treatment solution may be applied after application of the first treatment solution. This second treatment solution contains at least one (and possibly multiple) organofunctional silane which has been at least partially hydrolyzed. The organofunctional silane preferably has a trisubstituted silyl group, wherein the substituents are individually chosen from the group consisting of alkoxy and acetoxy, and at least one organofunctional group. The organofunctional group may be chosen from the group consisting of: amino (with any number of amino moieties), vinyl, ureido, epoxy, mercapto, cyanato, methacrylato, and vinylbenzyl. Particularly preferred organofunctional silanes include: γ-APS, γ-MPS, γ-UPS, γ-GPS, vinyltrimethoxysilane, vinyltriethoxysilane, and vinyltriacetoxysilane. The methods of the present invention are particularly suitable for treating aluminum and aluminum alloys (both in sheet form and cast). For these materials the preferred organofunctional silane (when employed) is a vinyl silane. In the first treatment solution, the total concentration of unhydrolyzed, multi-functional silanes employed to prepare the treatment solution should be greater than about 0.1% by volume (more preferably greater than about 1%, and ideally between about 2% and about 5%), based upon the total volume of treatment solution components. Curing may be performed at a temperature of between about 60° C. and about 250° C. for between about one minute and about 2 hours.

The methods of the present invention may also be effectively employed on cold-rolled steel (CRS), particularly when the CRS is to be painted. For CRS the preferred organofunctional silane is γ-APS. The total concentration of unhydrolyzed multi-functional silanes employed to prepare the first treatment solution may be between about 0.1% and about 10% by volume, based upon the total volume of first treatment solution components, and the total concentration of unhydrolyzed, organofunctional silanes employed to prepare the second treatment solution may be between about 0.1% and about 10% by volume, based upon the total volume of second treatment solution components. The pH of the first treatment solution should be less than about 7, and the total concentration of unhydrolyzed, multi-functional silanes employed to prepare the first treatment solution is preferably between about 1% and about 5%.

DETAILED DESCRIPTION OF THE PREFERRED EMBODIMENTS

Applicants have found that corrosion of metal, particularly cold-rolled steel ("CRS"), aluminum and aluminum alloys, can be prevented by applying a treatment solution containing one or more multi-functional silanes having either two or three trisubstituted silyl groups to the metal, wherein the multi-functional silane(s) has been at least partially hydrolyzed. This may be followed by a treatment solution containing one or more organofunctional silanes which have also been at least partially hydrolyzed, particularly when the metal is to be coated with a polymer such as paint. The corrosion protection provided by these coatings is surprisingly superior to conventional chromate based treatments, and avoids the chromium disposal problem. In addition, when the second solution employing an organofunctional silane is applied to the metal, the organofunctional silane coating need not be removed prior to painting or application of another polymer (such as adhesives or rubbers). To the contrary, the organofunctional silane coating offers improved paint adhesion, and, together with the multi-functional silane, provides excellent corrosion protection beneath the layer of paint.

As used herein, the term "multi-functional silane" means a silane having two or three trisubstituted silyl groups (i.e., bis- or tris-functional) wherein the substituents are individually chosen from the group consisting of alkoxy and acetoxy. The term "organofunctional silane" refers to a silane which has a single trisubstituted silyl group, and an organofunctional moiety which will react with the paint or other polymer coating (such as adhesives or rubbers) which may be applied over top of the organofunctional silane.

While not wishing to be bound by theory, it is believed that the silanol groups of the hydrolyzed multi-functional silane bonds very strongly and very quickly to the oxides on the surface of the metal. In addition, the multi-functional silane coats the metal surface well, therefore further improving the ability of the multi-functional silane to passivate the metal surface. The organofunctional silanes of the present invention, on the other hand, do not bond well to the metal surface, even when crosslinked in the manner described in U.S. Pat. No. 5,292,549 discussed above. These organofunctional silanes, however, will bond to a coating of a multi-functional silane of the present invention which has previously been applied to the metal surface (primarily through the silanol groups of the hydrolyzed organofunctional silane). The organofunctional moiety is then free to bond to paint, or other polymer coatings (such as adhesives and rubbers). Thus, Applicants have found that when an organofunctional silane of the present invention is employed, it should be applied to the metal only after a coating of a multi-functional silane of the present invention has been applied to the metal.

The treatment methods of the present invention may be used on any of a variety of metals, including CRS, aluminum (both in sheet form and cast), and aluminum alloy (both in sheet form and cast). It should be noted that the term "metal sheet" includes both continuous coil as well as cut lengths.

The preferred multi-functional silanes which may be employed in the present invention each have two or three trisubstituted silyl groups, wherein the substituents are individually chosen from the group consisting of alkoxy and acetoxy. Thus, the multi-functional silanes which may be used in the present invention may have the general structure of:

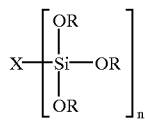

wherein X is either a bond, an aliphatic (saturated or unsaturated) or aromatic group, n is 2 or 3, and each R is an alkyl or acetyl group. Each R within the multi-functional silane can be the same or different, and thus the multi-functional silane may include both alkoxy and acetoxy moieties. For example, each R may be individually chosen from the group consisting of: ethyl, methyl, propyl, iso-propyl, butyl, iso-butyl, sec-butyl, ter-butyl and acetyl. X is preferably chosen from the group consisting of: a bond, $C_1$–$C_6$ alkyl (linear or branched), $C_1$–$C_6$ alkenyl (linear or branched), $C_1$–$C_6$ alkyl substituted with one or more amino groups, $C_1$–$C_6$ alkenyl substituted with one or more amino groups, benzyl, and benzyl substituted with $C_1$–$C_6$ alkyl. In the case where X is a bond, the multi-functional silane comprises two trisubstituted silyl groups which are bonded directly to one another, wherein the substituents are individually chosen from the group consisting of alkoxy and acetoxy (such as hexamethoxydisilane). One particularly preferred multi-functional silane is 1,2-bis-triethoxysilyl) ethane (hereinafter referred to as "BTSE"), which has the following formula:

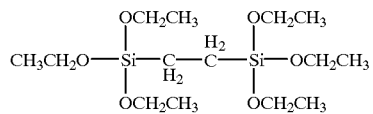

Other suitable multi-functional silanes include 1,2-bis-(trimethoxysilyl)ethane (TMSE), and 1,6-bis-(trialkoxysilyl)hexanes (including 1,6-bis-(trimethoxysilyl) hexanes), 1,2-bis-(triethoxysilyl)ethylene, 1,4-bis-(trimethoxysilylethyl)benzene, and 1,2-bis-(trimethoxysilylpropyl)amine.

The above-described multi-functional silanes must be at least partially, and preferably fully hydrolyzed so that the silane will bond to the metal surface. During hydrolysis, the alkyl or acetyl groups (i.e., the "R" moiety) are replaced with a hydrogen atom. As used herein, the term "partially hydrolyzed" simply means that only a portion of the alkyl or acetyl groups on the silane have been replaced with a hydrogen atom. The multi-functional silanes should be hydrolyzed to the extent that at least two of the alkyl or acetyl groups on each molecule have been replaced with a hydrogen atom. Hydrolysis of the multifunctional silane may be accomplished merely be mixing the silane with water, and optionally including a solvent such as an alcohol in order to improve solubility. The pH of the solution is also preferably maintained below about 7, and, in the case of BTSE, more preferably between about 4 and about 6, in order to improve hydrolysis. The pH may be adjusted, for example, by the addition of an acid, such as acetic, oxalic, formic or propionic acid. If the pH is permitted to increase above about 7, the hydrolyzed multi-functional silane may begin to polymerize via a condensation reaction. If this is permitted to occur, the corrosion resistance will be significantly reduced since the silane may not bond strongly to the metal surface.

The concentration of multifunctional silanes such as BTSE in the solution should be between about 0.1% and about 10%, preferably greater than 1%. More preferably, a concentration of between about 2% and about 5% is preferred. Although a more concentrated solution will provide a greater film thickness on the metal, this comes at the expense of increased cost. In addition, thicker films are often weak and brittle. It should be noted that the concentration of silanes discussed and claimed herein are all measured in terms of the ratio between the amount of unhydrolyzed, multi-functional silanes employed (i.e., prior to hydrolyzation, and the total volume of treatment solution components (i.e., silanes, water, optional solvents and pH adjusting acids). In addition, the concentrations refer to the total amount of unhydrolyzed multi-functional silanes added, as multiple silanes may optionally be employed in this treatment solution.

Since the solubility in water of some of the silanes used may be limited, the treatment solution may optionally include one or more solvents, such as alcohols, in order to improve silane solubility. The alcohol may also improve the stability of the treatment solution, as well as the wettability of the metal substrate. The use of alcohols or other non-aqueous solvents such as acetone is also particularly useful for metal substrates which are prone to corrosion upon mere contact with water (such as galvanic corrosion of certain alloys, including CRS). Particularly preferred alcohols include: methanol, ethanol, propanol, butanol and isomers thereof. The amount employed will depend upon the solubility of the particular multi-functional silanes in the treatment solution and thus the concentration range of alcohol to water in the treatment solution of the present invention is in the ratio of 1:99 to 99:1, (by volume). There should be sufficient water to ensure at least partial hydrolysis of the silane, and thus it is preferable that at least 5 parts of water be employed for every 95 parts of alcohol. Alcohols may, however, be omitted entirely if the silane(s) is soluble in water. When alcohols are employed, methanol and ethanol are the preferred alcohols.

The treatment method itself is straightforward. The unhydrolyzed multifunctional silane(s), water, alcohol (if needed), and a small amount of acetic acid (as needed to adjust the pH) are combined with one another. Other acids may alternatively be employed to adjust the pH as needed. The solution is then stirred at room temperature in order to at least partially hydrolyze the silane(s). This hydrolysis may take up to several hours to complete, and its completion will be evidenced by the solution remaining completely clear when water is added to a small sample of the solution.

The metal substrate to be treated is preferably solvent and/or alkaline cleaned (by techniques well-known in the prior art) prior to application of the above-described treatment composition of the present invention, and then allowed to dry. The metal may be preheated (preferably to a temperature between about 60° C. and about 250° C.) prior to coating with the multi-functional silane, particular in the case of aluminum alloys, as this preheating has been found to significantly improve the corrosion protection provided by the present invention. The treatment solution, however, can be maintained at room temperature. The treatment solution may then be applied directly onto the cleaned metal (i.e., with no other layers between the metal and the treatment composition of the present invention) by either dipping the metal into the solution (also referred to as "rinsing"), spraying the solution onto the surface of the metal, or even wiping or brushing the treatment solution onto the metal substrate. When the preferred application method of dipping is employed, the duration of dipping is not critical, as it will generally not affect the resulting film thickness. It is preferred that the dipping time be between about 2 seconds and about 30 minutes, preferably between about 1 and 2 minutes to insure complete coating of the metal.

If the metal is not to be coated with a polymer such as paint, and particularly in the case of aluminum and aluminum alloys, the multi-functional silane coating should be cured following the application process described above. Curing will polymerize the hydrolyzed silanol groups. The coated metal need not be dried prior to curing, as the curing itself will dry the surface. Alternatively, the metal may be blown dry or dried in place. Curing may be performed at temperatures between about 60° C. and about 250° C., for between about 1 minute and 2 hours, however curing will eventually take place even at room temperatures over a sufficient period of time. Preferably curing is performed at a temperature of about 200° C. for about 10 minutes.

Following the cure, a second coating of the multi-functional silane(s) is preferably applied, and then cured in the same manner. The metal substrate may be cooled prior to application of the second coating, however applicants have achieved excellent results by applying the second coating without first cooling the substrate (i.e., by merely quenching the cured metal substrate by dipping the heated substrate into the room temperature treatment solution). Additional coatings may be similarly applied, however two coatings has been found to provide more than sufficient protection which is at least equal to that provided by conventional chromate pretreatments.

The above treatment method has been shown to perform better than that of the sol-gel technology proposed by others, and in fact approaches the performance of a heavy chromate coating. This technique has been found to be particularly advantageous for aluminium alloys, including 2024-T3, 7075, 356 and 380. The silane film is typically between about 100 and about 1000 Ångstroms thick (depending upon silane concentration and the solvents employed), and, in the case of aluminium 2024-T3 alloy, provides corrosion resistance to immersion in a 3% aerated salt solution of 175 hours or more. By way of comparison, an untreated 2024-T3 sheet provides corrosion resistance for less than 12 hours. The film is believed to form covalent, non-hydrolyzable bonds with the metal oxide, and is also highly hydrophobic, which contributes to the corrosion performance. The film is completely stable in air, is colourless, is pore free (particularly when a second coating is applied), and provides unexpectedly excellent corrosion protection.

If the metal is to be painted or coated with another polymer (such as adhesives or rubbers) application of the multi-functional silane(s) treatment solution is preferably followed by the application of a second treatment solution containing one or more organofunctional silanes which have been at least partially hydrolyzed. The organofunctional silane(s) will not only bond with the multi-functional silane coating, but the organofunctional moiety will also bond with the paint or other polymer coating applied over top of it. Multiple layers of the multi-functional silane(s) may be first applied, however, the final layer of the multi-functional silane(s) should be only partially cured (or not cured at all) in order to insure that the organofunctional silane(s) will bond to the multi-functional silane layer (by means of the silanol group on the hydrolyzed organofunctional silane). In other words, if two coatings of a multi-functional silane such as BTSE is applied, the first coating may be cured as described above, while the second coating is left uncured. An organofunctional silane is then applied over top of the second, uncured layer of BTSE. In this manner, the organofunctional silane coating will react with, and therefore bond to the multi-functional silane coating, and paint or other polymers will bond to the organofunctional silane coating. This technique is particularly suitable for CRS, aluminum and aluminum alloys.

Numerous types of organofunctional silanes may be employed for this top coating, particularly those containing a trisubstituted silyl group, wherein the substituents are individually chosen from the group consisting of alkoxy and acetoxy, and at least one free organofunctional moiety which will react with the paint or other polymer coating (such as adhesives or rubbers). More preferably, the trisubstituted silyl group is at one terminus of the organofunctional silane, and the organofunctional moiety is at the opposite terminus. The organofunctional moiety may be, for example, amino (with any number of amino moieties), vinyl, ureido, epoxy (including glycidoxy), mercapto, cyanato, methacrylato, vinylbenzyl. Particularly suitable organofunctional silanes include: γ-aminopropyltriethoxysilane (γ-APS); γ-mercaptopropyltrimethoxysilane (γ-MPS); γ-ureidopropyltrialkoxysilane (γ-UPS); γ-glycidoxypropyltrimethoxysilane (γGPS); and any of a variety of vinyl silanes (i.e., an organofunctional silane wherein the organofunctional moiety is a vinyl group) including vinyltrimethoxysilane (VS), vinyltriethoxysilane, vinyltriacetoxysilane. For aluminum and aluminum alloys any of the above-mentioned vinyl silanes are preferred (particularly VS), while γ-APS is preferred for CRS.

Application of the organofunctional silanes may be accomplished in a manner similar to that described for the multi-functional silanes. Thus, the organofunctional silane should be at least partially, and preferably completely hydrolyzed. This may be accomplished by merely mixing the organofunctional silane(s) with water, and proper maintenance of the pH. For some organofunctional silanes, hydrolysis will occur at an alkaline pH, and thus the pH should be maintained at the optimum level which promotes hydrolysis and limits condensation of the organofunctional silane. For example, the "natural" pH of an aqueous solution of γ-APS is 10.4. The term "natural pH" refers to the pH of a 1% (by volume) aqueous solution of γ-APS. At this pH, the γ-APS is fully hydrolyzed, and therefore the pH need not be reduced. Similarly, the natural pH of γ-UPS is about 8.1, and the γ-UPS is fully hydrolyzed. For γ-MPS, γ-GPS and vinyl silanes, the pH should be maintained below about 7. Once again an acid such as acetic, oxalic, formic or propionic acid may be used to maintain the pH, and various types of solvents such as alcohols may be employed to improve solubility. Concentrations of the organofunctional silanes are calculated in the manner previously described, and it is preferred that between about 0.1% and about 10% of organofunctional silane(s) be employed in this second treatment solution. More preferably, between about 1% and about 5% organofunctional silane(s) is employed. It should be pointed out that as was the case previously, multiple organofunctional silanes may be employed.

The method of application of the organofunctional silane is similar to that previously described. Thus, immediately after the final layer of multi-functional silane(s) has been applied and preferably only partially cured, the second treatment solution containing the organofunctional silane(s) is applied to the metal. Application may be accomplished by spraying, dipping or other means well known to those skilled in the art. A single coating of the organofunctional silane(s) is sufficient, and the substrate may then be dried at room temperature prior to application of paint or other polymer coating.

By employing this dual-coat of a multi-functional silane (s) followed by an organofunctional silane(s), not only is excellent corrosion protection provided, but also excellent paint adherence. The paint or other polymer coating may be applied directly on top of the organofunctional silane(s). In addition, the organofunctional silane may be chosen depending upon the type of paint or polymer to be employed, and thus the methods of the present invention can be precisely tailored to the particular application.

The examples below demonstrate some of the superior and unexpected results obtained by employing the methods of the present invention.

EXAMPLE 1

A 3% solution of hydrolyzed BTSE was prepared as follows. 3 ml of BTSE was added to 0.3 ml of acetic acid with magnetic stirring. 3 ml of water was then added to this solution, followed by 94 ml of methanol. This order of addition is preferred, as the early use of acetic acid helps prevent condensation of the BTSE. Samples of 2024-T3 (2.5 cm×10 cm) were then ultrasonically solvent cleaned for 15 minutes in hexanes, 15 minutes in acetone, and 15 minutes in methanol. The samples were then dipped (at room temperature) into the 3% BTSE solution for approximately 100 seconds, and then blown dry with air. After drying, the coated samples were then cured at 100° C. for 15 minutes. The dipping/drying/curing steps were then repeated two additional times, such that a total of three layers of BTSE were deposited on the samples.

The BTSE-coated samples (prepared as above), untreated samples, and samples treated by a conventional chromating process were then partially immersed in a 3% NaCl solution, and the water line was monitored for evidence of corrosion. Corrosion began to appear on the untreated samples in less than 12 hours, and in 100 to 150 hours for the chromated samples. The BTSE-coated samples exhibited no corrosion after 175 hours.

EXAMPLE 2

The steps of Example 1 were repeated, however the number of coats applied, and the use of a cure step and cure temperature were varied in the manner shown in the table below. Samples were also preheated to the indicated temperature prior to-application of the first coating of BTSE. The corrosive protection provided by the BTSE coating was then measured by conducting standard electrochemical polarization tests using a 3% NaCl solution. The voltage range was varied from −200 mV to +200 mV, with a scan rate of 1 mV/s. The results of these tests are shown below, wherein the rate of corrosion is reported in millimeters per year. In these examples, the samples were preheated to the cure temperature prior to application of the first BTSE coating, and were not cooled between curing and the application of a second coating of BTSE.

| Sample | | Corr. Rate (mpy) |
|---|---|---|
| 100° C. Preheat and Cure | single coat | 0.578 (1.83 × $10^{-8}$ mm/sec) |
| | single coat with cure | 0.038 (1.20 × $10^{-9}$ mm/sec) |
| | double coat with cure between coats | 0.221 (1.70 × $10^{-9}$ mm/sec) |
| | double coat with cure after each coat | 0.021 (6.60 × $10^{-10}$ mm/sec) |
| 150° C. preheat | single coat | 0.134 (4.24 × $10^{-9}$ mm/sec) |
| | single coat with cure | 0.013 (4.12 × $10^{-10}$ mm/sec) |
| and cure | double coat with cure between coats | 0.031 (9.83 × $10^{-10}$ mm/sec) |
| | double coat with cure after each coat | 0.015 (4.71 × $10^{-10}$ mm/sec) |
| 200° C. preheat | single coat | 0.043 (1.36 × $10^{-9}$ mm/sec) |
| | single coat with cure | 0.017 (5.39 × $10^{-10}$ mm/sec) |
| and cure | double coat with cure between coats | 0.004 (1.27 × $10^{-10}$ mm/sec) |
| | double coat with cure after each coat | 0.004 (1.27 × $10^{-10}$ mm/sec) |
| Chromated (Standard chromate treatment) | | 0.004 (1.27 × $10^{-10}$ mm/sec) |
| | | 0.003 (9.51 × $10^{-11}$ mm/sec) |
| | | 0.007 (2.22 × $10^{-10}$ mm/sec) |
| | | 0.003 (9.51 × $10^{-11}$ mm/sec) |

EXAMPLE 3

Filiform corrosion occurs on metallic surfaces which have been coated with a thin organic film (such as paint). The pattern of attack is characterized by the appearance of fine filaments emanating from one or more sources in semi-random directions. The source of initiation is usually a defect or mechanical scratch in the coating. The filaments are fine tunnels composed of corrosion products underneath the bulged and cracked coating.

Samples of cast Al356 alloy known to be sensitive to filiform corrosion were treated with a BTSE solution in the manner described above and as indicated in the table below. A 3% BTSE solution at a pH of 5 was employed. In addition, one of the samples was coated with a 3% solution of vinyl silane (at a pH of 5), after application of BTSE. The dried samples were then painted with a clear polyester powder coating and subjected to GM 4476P Copper Accelerated Acetic Acid-Salt Spray Test. The samples were periodically observed for filiform corrosion. As indicated in the table below, the treatment methods of the present invention provided excellent protection against filiform corrosion, even exceeding the results obtained with a standard chromate treatment (CHEM COTE 3530 chromate treatment available from Brent America, Inc.)

| Treatment Method | Initiation of Filiform Corrosion |
|---|---|
| No treatment prior to painting | <1 day |
| Standard chromating | 1 week |
| Coat with BTSE solution, cure at 100° C. for 15 minutes, cool to room temperature, coat with BTSE, cure at 100° C. for 15 minutes, cool to room temperature | none after 4 weeks |
| Preheat to 200° C. for 15 minutes, coat with BTSE solution, cure at 200° C. for 15 minutes, coat with BTSE, cure at 200° C. for 15 minutes | none after 4 weeks |
| Preheat to 200° C. for 15 minutes, coat with BTSE solution, cure at 200° C. for 15 minutes, coat with vinyl silane, cure at 200° C. for 15 minutes | none after 4 weeks |

EXAMPLE 4

Samples of CRS (10 cm×15 cm×0.5 mm) were treated according to the methods of the present invention, coated with a polyurethane powder paint (6570 μm thick), and then cured for 10 minutes at 200° C. In order to measure creepage, which in turn is indicative of the degree of paint adhesion and corrosion protection, a carbide-tipped pencil-type scribing tool was used to create a 7 cm long scribe in each of the samples. The scribe was sufficiently deep to expose the base metal. The scribed panels were then subjected to a cyclic corrosion test (GM9540P) for two weeks and/or a salt spray test (ASTM B117) for 25 days. At the end of that time, a piece of strong, industrial adhesive tape was secured atop each scribe and then pulled off of the panel. The average width of the area of paint delamination was then measured, and the following results obtained:

| Treatment Method (prior to painting) | Scribe Creep (mm) |
|---|---|
| alkaline cleaning only | 30.0 (GM 9540P) |
| alkaline cleaning only | 23.1 (ASTM B117) |
| alkaline cleaning followed by an iron phosphate treatment | 14.5 (GM 9540P) |
| alkaline cleaning followed by an iron phosphate treatment | 51.0 (ASTM B117) |
| alkaline cleaner, water rinse, iron phosphate, water rinse and chromate rinse | 5.0 (GM 9540P) |
| alkaline cleaner, water rinse, iron phosphate, water rinse and chromate rinse | 2.2 (ASTM B117) |
| dipped in 2% BTSE solution (pH 6) for 2 minutes blown dry, dipped in 5% γ-APS (pH 10.5) for 30 seconds, blown dry | 2.5 (GM 9540P) |
| dipped in 2% BTSE solution (pH 6) for 2 minutes blown dry, dipped in 5% γ-APS (pH 10.5) for 2 minutes, blown dry, cured for 10 minutes at 200° C. | 2.6 (ASTM B117) |

CHEM CLEAN 1353 alkaline cleaner, CHEM COTE 3029 iron phosphate and CHEM SEAL 3603 chromate rinse were employed in the above examples. All of these products are commercially available from Brent America, Inc.

The above results clearly demonstrate that the treatment methods of the present invention are effective in treating CRS prior to painting.

EXAMPLE 5

The methods of Example 4 were repeated, however a polyester powder paint was applied (60 μm thick), and was then cured for 10 minutes at 200° C. The results are as shown below.

| Treatment Method (prior to painting) | Scribe Creep (mm) |
|---|---|
| alkaline cleaning only | 32.0 (GM 9540P) |
| alkaline cleaning only | 34.1 (ASTM B117) |
| alkaline cleaning followed by an iron phosphate treatment | 23.0 (GM 9540P) |
| alkaline cleaning followed by an iron phosphate treatment | 52.4 (ASTM B117) |
| alkaline cleaner, water rinse, iron phosphate, water rinse and chromate rinse | 4.0 (GM 9540P) |
| alkaline cleaner, water rinse, iron phosphate, water rinse and chromate rinse | 2.2 (ASTM B117) |
| dipped in 2% BTSE solution (pH 6) for 2 minutes blown dry, dipped in 5% γ-APS (pH 10.5) for 2 minutes, blown dry | 3.0 (GM 9540P) |
| dipped in 2% BTSE solution (pH 6) for 2 minutes blown dry, dipped in 5% γ-APS (pH 10.5) for 2 minutes, blown dry | 1.4 (ASTM B117) |

The above results once again show the effectiveness of the treatment methods of the present invention. In addition, Applicants have also found that slight variations in the pH, dipping time, concentrations, and age of the solutions had no effect on the performance of the treatment methods of the present invention. In addition, the treated CRS panels can be stored in ambient for at least 30 days prior to painting without a loss of performance. It is believed that the BTSE/γ-APS treatment passivates the steel, and therefore prevents the format on of corrosion. in the atmosphere.

As indicated by the above results, the treatment methods of the present invention provide significant protection against corrosion as compared to both untreated panels as well as those treated with the phosphate/chromate treatment method of the prior art. These results clearly indicate that the treatment methods of the present invention not only provide excellent corrosion resistance, but also excellent paint adhesion.

The foregoing description of preferred embodiments is by no means exhaustive of the variations in the present invention that are possible, and has been presented only for purposes of illustration and description. In addition to providing corrosion protection, the treatment methods of the present invention also improve paint or polymer adhesion, and hydrophobicity. The coatings are also colourless, homogeneous, and relatively soft (i.e., non-brittle). Obvious modifications and variations will be apparent to those skilled in the art in light of the teachings of the foregoing description without departing from the scope of this invention. For example, various types of polymer coatings other than paint may be applied on top of the coatings of the present invention. In addition, BTSE is but merely one exemplary multi-functional silane which may be employed. Thus, it is intended that the scope of the present invention be defined by the claims appended hereto.

What is claimed is:

1. A method of treating a metal substrate, comprising the steps of:
   (a) providing a metal substrate;
   (b) applying a coating of a first treatment solution directly onto the surface of said metal, said first treatment solution comprising at least about 0.1% by volume of at least one silane, wherein the silane consists only of multi-functional silane having at least two trisubstituted silyl groups wherein the substituents are individually chosen from the group consisting of alkoxy and acetoxy, wherein said multi-functional silane has been at least partially hydrolyzed, and wherein said first treatment solution has a pH of less than about 7.

2. The method of claim 1, wherein said at least one multi-functional silane comprises:

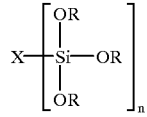

wherein X is selected form the group consisting of a bond, an aliphatic group and an aromatic group; each R is an alkyl or acetyl group; and n is 2 or 3.

3. The method of claim 2, wherein each R is individually chosen from the group consisting of: ethyl, methyl, propyl, iso-propyl, butyl, iso-butyl, sec-butyl, ter-butyl and acetyl.

4. The method of claim 2, wherein X is chosen from the group consisting of: a bond, $C_1$–$C_6$ alkyl, $C_1$–$C_6$ alkenyl, $C_1$–$C_6$ alkyl substituted with at least one amino group, $C_1$–$C_6$ alkenyl substituted with at least one amino group, benzyl, and benzyl substituted with $C_1$–$C_6$ alkyl.

5. The method of claim 1, wherein said multi-functional silane is 1,2-bis-(triethoxysilyl)ethane.

6. The method of claim 1, wherein said metal is chosen from the group consisting of: cold-rolled steel, aluminum and aluminum alloy.

7. The method of claim 1, further comprising the step of curing said coating after step (b), at a temperature of between about 60° C. and about 250° C. for between about one minute and about 2 hours.

8. The method of claim 7, further comprising the step of applying a second coating of said first treatment solution after said curing step.

9. The method of claim 7, further comprising the steps of applying a second coating of said first treatment solution after said curing step, and curing said second coating.

10. The method of claim 1 further comprising the step of applying a second coating of a second treatment solution after application of said first treatment solution, said second treatment solution containing at least one organofunctional silane which has been at least partially hydrolyzed.

11. The method of claim 10, wherein said at least one organofunctional silane has a trisubstituted silyl group, wherein the substituents are individually chosen from the group consisting of alkoxy and acetoxy, and at least one organofunctional group.

12. The method of claim 10, wherein said organofunctional group contains an organofunctional group chosen from the group consisting of: amino, vinyl, ureido, epoxy, mercapto, cyanato, methacrylato, and vinylbenzyl.

13. The method of claim 10, wherein said at least one organofunctional silane is chosen from the group consisting of: γ-aminopropyltriethoxysilane, γ-mercaptopropyltrimethoxysilane, γ-ureidopropyltrialkoxysilane, γ-glycidoxypropyltrimethoxysilane, vinyltrimethoxysilane, vinyltriethoxysilane, and vinyltriacetoxysilane.

14. The method of claim 1, wherein said metal is pre-heated to a temperature of between about 60° C. and about 250° C. prior to application of the first treatment solution.

15. The method of claim 10, wherein the metal substrate is selected from the group consisting of aluminum and aluminum alloy.

16. The method of claim 1, wherein the total concentration of multi-functional silanes in said treatment solution is greater than about 0.1% by volume, based upon the total volume of treatment solution components.

17. The method of claim 1, wherein the total concentration of multi-functional silanes in said treatment solution is between about 2% and about 5%.

18. The method of claim 10, further comprising the step of applying a final coating of a solution containing at least one organofunctional silane which has been at least partially hydrolyzed.

19. A method of pretreating cold-rolled steel, comprising the steps of:
(a) providing a first treatment solution consisting essentially of at least one multi-functional silane which has been at least partially hydrolyzed, wherein said multi-functional silane has at least two trialkoxysilyl groups;
(b) providing a second treatment solution comprising at least one organofunctional silane which has been at least partially hydrolyzed;
(c) applying a coating of said first treatment solution directly onto the surface of the steel; and
(d) thereafter applying a coating of said second treatment solution onto said steel.

20. The method of claim 19, wherein the total concentration of multi-functional silanes in said first treatment solution is between about 0.1% and about 10% by volume, based upon the total volume of first treatment solution components, and wherein the total concentration of organofunctional silanes in said second treatment solution is between about 0.1% and about 10% by volume, based upon the total volume of second treatment solution components.

21. The method of claim 19, wherein said at least one organofunctional silane is γ-aminopropyltriethoxysilane, and the total concentration of multi-functional silanes in said treatment solution is between about 1 and about 5% by volume.

22. A treatment solution composition comprising at least about 0.1% by volume of at least one silane, wherein the silane consists only of multi-functional silane having at least two trisubstituted silyl groups wherein the substituents are individually chosen from the group consisting of alkoxy and acetoxy, in an aqueous alcohol solution, wherein the concentration range of alcohol to water is in the ratio of about 1:99 to about 99:1, and wherein the total concentration of multi-functional silanes in said treatment solution is between about 2% and about 5% by volume, based upon the total volume of said treatment solution components.

23. The composition of claim 22, wherein the concentration range of alcohol to water is in the ratio of about 5:95 to about 95:5.

24. A method of treating a metal substrate, comprising the steps of:
(a) providing a metal substrate;
(b) applying at least one coating of a first treatment solution onto the surface of said metal to afford a coated metal surface, said first treatment solution comprising at least about 0.1% by volume of at least one silane, wherein the silane consists only of multi-functional silane having at least two trisubstituted silyl groups wherein the substituents are individually chosen from the group consisting of alkoxy and acetoxy, wherein said multi-functional silane has been at least partially hydrolyzed, and wherein said first treatment solution has a pH of less than about 7; and
(c) applying a polymer coating onto the coated metal surface.

25. The method of claim 24, wherein the polymer coating is selected from the group consisting of paints, adhesives and rubber coatings.

26. The method of claim 24, wherein said at least one multi-functional silane comprises:

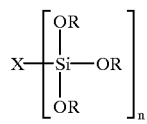

wherein X is selected form the group consisting of either a bond, an aliphatic group, and an aromatic group; each R is an alkyl or acetyl group; and n is 2 or 3.

27. The method of claim 26, wherein each R is individually chosen from the group consisting of: ethyl, methyl, propyl, iso-propyl, butyl, iso-butyl, sec-butyl, ter-butyl and acetyl.

28. The method of claim 26, wherein X is chosen from the group consisting of: a bond, $C_1$–$C_6$ alkyl, $C_1$–$C_6$ alkenyl, $C_1$–$C_6$ alkyl substituted with at least one amino group, $C_1$–$C_6$ alkenyl substituted with at least one amino group, benzyl, and benzyl substituted with $C_1$–$C_6$ alkyl.

29. The method of claim 24, wherein said multi-functional silane is 1,2-bis-(triethoxysilyl)ethane.

30. The method of claim 24, wherein said metal is chosen from the group consisting of: cold-rolled steel, aluminum and aluminum alloy.

31. The method of claim 24, further comprising the step of curing said coating after step (b), at a temperature of between about 60° C. and about 250° C. for between about one minute and about 2 hours.

32. The method of claim 31, further comprising the step of applying a second coating of said first treatment solution after said curing step.

33. The method of claim 31, further comprising the steps of applying a second coating of said first treatment solution after said curing step, and curing said second coating.

34. The method of claim 24 further comprising the step of applying a second coating of a second treatment solution after application of said first treatment solution, said second treatment solution containing at least one organofunctional silane which has been at least partially hydrolyzed.

35. The method of claim 34, wherein said at least one organofunctional silane has a trisubstituted silyl group, wherein the substituents are individually chosen from the group consisting of alkoxy and acetoxy, and at least one organofunctional group.

36. The method of claim 34, wherein said organofunctional silane contains an organofunctional group chosen from the group consisting of: amino, vinyl, ureido, epoxy, mercapto, cyanato, methacrylato, and vinylbenzyl.

37. The method of claim 34, wherein said at least one organofunctional silane is chosen from the group consisting of: γ-aminopropyltriethoxysilane, γ-mercaptopropyltrimethoxysilane, γ-ureidopropyltrialkoxysilane, γ-glycidoxypropyltrimethoxysilane, vinyltrimethoxysilane, vinyltriethoxysilane, and vinyltriacetoxysilane.

38. The method of claim 24, wherein said metal is preheated to a temperature of between about 60° C. and about 250° C. prior to application of the first treatment solution.

39. The method of claim 24, wherein the metal substrate is selected from the group consisting of aluminum and aluminum alloy.

40. The method of claim 39, wherein the total concentration of multi-functional silanes in said treatment solution is greater than about 1% by volume, based upon the total volume of treatment solution components.

41. The method of claim 39, wherein the total concentration of multi-functional silanes in said treatment solution is between about 2% and about 5%.

42. The method of claim 34, further comprising the step of applying a final coating of a solution containing at least one organofunctional silane which has been at least partially hydrolyzed.

* * * * *

UNITED STATES PATENT AND TRADEMARK OFFICE
CERTIFICATE OF CORRECTION

PATENT NO. : 6,261,638 B1
DATED : July 17, 2001
INVENTOR(S) : van Ooij et al.

It is certified that error appears in the above-identified patent and that said Letters Patent is hereby corrected as shown below:

Column 12,
Line 57, change "form" to -- from --.

Column 14,
Line 54, change "form" to -- from --.

Signed and Sealed this

Fourth Day of June, 2002

*Attest:*

*Attesting Officer*

JAMES E. ROGAN
*Director of the United States Patent and Trademark Office*